United States Patent [19]

Cattaneo

[11] Patent Number: 4,469,837
[45] Date of Patent: Sep. 4, 1984

[54] POLYVINYL-ALCOHOL-BASED THERMOPLASTIC COMPOSITION

[76] Inventor: Pietro Cattaneo, Via Simone d'Orsenigo 18, Milan, Italy

[21] Appl. No.: 438,525

[22] Filed: Nov. 1, 1982

[30] Foreign Application Priority Data

Oct. 30, 1981 [IT] Italy .............................. 24798 A/81

[51] Int. Cl.$^3$ ................................................ C08K 5/05
[52] U.S. Cl. ..................................... 524/388; 524/387; 524/430; 524/432; 524/557
[58] Field of Search ................ 524/387, 388, 557, 430, 524/432

[56] References Cited

U.S. PATENT DOCUMENTS 4,323,492  4/1982  Zimmermann et al. ............ 524/387

Primary Examiner—Joseph L. Schofer
Assistant Examiner—J. M. Reddick
Attorney, Agent, or Firm—Stevens, Davis, Miller & Mosher

[57] ABSTRACT

This invention relates to a thermoplastic composition based on polyvinyl alcohol, which is adapted to be subjected, as such, to the common methods of shaping in the hot condition used for thermoplastic materials, such as molding and extrusion, for the product of articles, characterized in that it is composed of a substantially dry mixture of said polyvinyl alcohol with at least one or more solid polyhydroxylated monomeric alcohols, which, as such or in admixture with each other, exhibit their main peak melting point, as determined by Differential Thermal Analysis, between 160° C., and 230° C.

9 Claims, No Drawings

POLYVINYL-ALCOHOL-BASED THERMOPLASTIC COMPOSITION

Polyvinyl alcohols, as obtained commercially by acidic hydrolysis, or alkaline hydrolysis, of polyvinyl acetate, are usually in the form of powdered solids or particulates having a maximum grit size of 1 mm and containing from 2% to 5% of volatile substances, these being mainly the adsorbed atmospheric humidity.

These alcohols are stable to prolonged aging but are tendentially hygroscopic, so that they can absorb water up to 10% of their weight when maintained for a long time in an environment having from 65% to 70% of Relative Humidity at 25° C. The general formula of polyvinyl alcohol (PVA) as obtained by controlled hydrolysis of polyvinyl acetate can be expressed as follows:

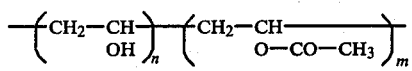

wherein the n alcoholic groups and the m acetyl groups which have not been hydrolyzed can alternately be arranged along the molecule randomly, or in the form of small homogeneous sequences or blocks.

The molar concentration, or degree of hydrolysis of the PVA is given by the expression: $100\ n/(n+m)$.

When the ratio of n to m exceeds 4:1, the PVA derivative takes up physico-chemical properties which are extremely interesting for industrial uses, such as the high tenacity and tensile strength and the outstanding imperviousness to nearly all the most commonly used gases, such as oxygen, nitrogen, carbon dioxide, and also to the vapours and organic liquids, water being however excluded as well as methanol and other eminently polar substances.

The sensitivity to liquid water or water vapor and thus the proneness to dissolution can drastically be reduced by subjecting the PVA articles to particular heat treatments or by chemical substances having a hardening or a cross-linking action, or also by using PVA having an n:m ratio over 95:5 or, as a further alternative, by preparing multiply articles in which the innermost layer is coated on both sides by a water-repellent thermoplastic material, such as polyethylene or its derivatives or by special hydrophobic lacquers.

The principal problem which has heretofore confronted the PVA transformation industry has been that of the poor heat resistance of this material at the processing temperatures which are required for melting and fluidizing the material concerned.

As a matter of fact, it is not possible to convert a PVA powder as such into an extruded article or an injection molded item by feeding PVA directly to a conventional extruder or injector, as it is common practice to do with the most commonly used plastics materials such as polystyrene, polyethylene, polyvinyl chloride, polyamides, only to cite the best known of them, without preventing the PVA mass, which, in theory, should melt between 160° C. and 230° C., from originating coarse lumps a material which is degraded and partially cross-linked as it emerges from the processing lines.

Acidic vapors can furthermore be evolved, which are originated by the depolymerization of the residual acetyl radicals.

Attempts have been performed heretofore in order to offset such a shortcoming, according to two principal routes, viz.:

(a) By dissolving the PVA beforehand in a great mass of water, equal to from three to five times its weight and then continually depositing on hot rollers or hot metal tapes the solution and evaporating off the excess water. By so doing, one obtains films or monofilaments of pure PVA or of PVA modified with glycols or glycerol, these latter having previously been added to the water used as a primary plasticizer, and (b) By adding to the powdered PVA minor amounts (15% to 50%) relative to the weight of the PVA of water and liquid plasticizers, generally glycols and glycerol, and permitting that a complete soaking with them may take place either statically (a ripening) or dynamically (slow or speedy stirring) prior to feeding the thus plasticized PVA to the extruders for films, monofilaments or to apparatus for article shaping by blowing. Simultaneously with the extrusion, or immediately after the emersion of the extrudate, the excess water is caused rapidly to be evaporated off.

The technical art which adopted such basic expedients is disclosed in a number of publication and patents, among which the following can be mentioned:

U.S. Pat. Nos. 3,471,594; 3,561,493; 3,607,812 and 3,679,437.

Other literature of a certain interest is:

U.S. Pat. Nos. 3,985,849; 4,244,914; 3,425,979 and 3,440,316.

In all the cases mentioned above the use of a PVA which already contains incorporated therein the aqueous or the polyhydroxylated plasticizer is considered a must to the end of a correct conversion of such PVA into articles having a quality which is suitable for the intended use.

Contrary to all the indications in this matter as reported by the conventional art, it has been surprisingly ascertained, according to the present invention, that it is neither necessary nor essential to operate in such a way as to have the polyvinyl alcohol (PVA) previously absorbing water or liquid plasticizers in order that it may be thermoplastically processed in the conventional extrusion or molding machinery as commonly used for the conversion of the plastics materials.

According to the present invention, it suffices to mechanically blend in dry conditions the powdered or particulated PVA with variable amounts (from 10 to 50 parts on 100 parts of PVA) of polyhydric alcohols having a powdery consistency at room temperature and having, either individually or in mutual admixture a main melting point peak comprised between 160° C. and 230° C., as measured with the method of Differential Thermal Analysis (DTA) with a scanning speed comprised between 4° C./minute and 16° C./minute.

According to the invention, it is preferred that said polyhydric alcohols:

(a) Are composed, for at least 50% of their weight, by polyhydric alcohols which contain at least three primary alcoholic functions (—CH₂OH) per mol. The 50% balance can be composed of polyhydric alcohols having two primary alcoholic groups, secondary alcoholic groups (>CHOH) being optionally present;

(b) Are substantially anhydrous, or, at any rate, do not contain more than 20% by weight of water, the crystallization water being included.

Typical examples of polyhydric alcohols having a high melting point temperature which are suitable for the purposes of the present invention are pentaerythritol [C(CH$_2$OH)$_4$] pure (m.p. 260° C.) or its technical grade which contains bipentaerythritol (m.p. 195° C.-225° C.) as an impurity, technical grade bipentaerythritol (m.p. 210° C.-220° C.), trimethylolethane [CH$_3$—C(CH$_2$OH)$_3$] having a m.p. of 201° C. and, lastly, mannitol [HO-CH$_2$—(CHOH)$_4$—CH$_2$OH] with a m.p. of 166° C.

It is possible to add to said polyhydric alcohols, small percentages of other liquid alcohols or, at any rate, of hydroxylated chemicals such as glycerols, glycols, ether-glycols, etherified polyhydroxy glycols and others, so as to adjust the final melting point of the mixture to the desired value, which must be comprised at any rate between 160° C. and 230° C. Organic compounds with at least one hydroxyl group, such as monoethers, glycol monoesters, polycondensed glycols and inorganic compounds such as metallic oxides, carbonates, silicates, mineral salts having a melting point higher than 160° C., both in their hydrous and anhydrous forms. Once the polyvinyl alcohol has been dry blended with the mixture of polyhydric alcohols having a high melting point, the product is ready for being converted into a finished article (with or without the addition thereto of optional conventional processing aids such as lubricants, mineral fillers, metal oxides as generally tolerated by the polyvinyl alcohol base, or other polymers which are partially compatible), it being obvious, therefore, that there is the advantage over the conventional art of dispensing with lengthy preliminary steps such as dissolution in water, or impregnation with liquid plasticizers, of the raw material to be shaped.

The conversion into a finished article can be obtained by extrusion with the conventional machinery as used for the production of films, monofilaments, tubes, slabs, blown extrudates of known plastics materials such as polyolefines chlorovinyl resins and polyamide resins.

Such machines generally comprise a feeding hopper, a screw extruder, a melt collecting head, a spinneret for shaping the article and a system for cooling and solidifying the latter.

The only caution to be taken for processing the aforementioned PVA-polyhydric alcohol blend is to adopt a cooling and solidification system for the finished article, which excludes the presence of liquid water which, as is known, swells or dissolves PVA unless the latter is post-processed with subsequent cross-linking steps.

Moisture which is inevitable contained in PVA compositions, both because it is introduced during blending with the polyhydric alcohols and because it is absorbed from the environment during storage, is usually driven off in the form of steam flowing back from the feeding section of the extruding screw towards the loading hopper, whenever the moisture contents is small (from 1% to 3%).

For higher moisture contents the usual methods are adopted for removing the excess volatile substances from the usual plastics materials, such as preheating the loading hopper or using extruder equipped with a venting contrivance for venting into the atmosphere the volatile substances, said venting contrivances being properly placed along the cylindrical barrel of the extruder.

The conventional extruders having a screw and three feeding zones for feeding, compressing and metering and having a length to diameter ratio greater than 20:1 and a compression ratio between 2 and 3 can be adopted.

The temperature trend is the well known trend which rises from the feeding zone to the metering zone, as used for the other plastics materials.

Suggested temperatures are from 180° C. to 240° C. as a function of the degree of hydrolysis and the viscosity of the PVA and of the percentage of the added polyhydric alcohols.

In addition to the conventional methods for extruding articles as single-piece items, it is possible to produce articles of the multilayered class in which one layer at least is based on the PVA as disclosed herein.

To obtain such articles, it is sufficient to have at hand one of the many coestrusion heads as designed for extruding together different plastics materials.

By adopting such machineries the working conditions for extruding PVA are much akin to those which can be used for extruding semirigid polyvinyl chloride.

In connection with injection molding, the well known machinery having a pre-plasticizing screw can be used and working under very much the same conditions as for polyolefin molding, or for molding polychlorovinyl resins or polystyrene resins.

In as much as the satisfactory results which can be obtained with the mechanically dry blended mixtures of PVA and solid polyhydric alcohols in extrusion and dry molding as described herein cannot be reproduced when using powdered polyvinyl alcohol which has been superficially moisturized with liquid plasticizers such as glycols and/or glycerols, it is apparent that during the flow through the extruder, the mechanisms which carry out the thermal plasticizing step for PVA are radically different in the two cases.

It can be surmised that one of the differentiating factors be bound to the considerable difference between the frictional forces which are evolved between solid particles of PVA and polyhydric alcohols and those produced between PVA particles which have been wetted by liquid plasticizers which have not yet been incorporated in the PVA mass during the relative motion impressed by the helical rotation impressed by the extruding screw.

This fact originates a different way of evolution and intensity of the conversion of mechanical energy into heat within the mass of the plastics material and thus different plasticizing velocities and local superheating are experienced.

These, however, are but speculations as to the physical mechanisms which have been deduced a posteriori from a fact which is surprising as itself, so that they cannot be construed as being an explanation, nor can they be construed as limitations to the scope of this invention.

In order that the features and the advantages of the present invention may be better appreciated, a few examples of reduction of the invention to constructive practice are reported hereunder and should not be taken as limitations.

EXAMPLE 1

A rotary-blade blender working at 300 rpm is charged with 100 parts (weight basis) of granulate powdered polyvinyl alcohol having a degree of polymerization (average degree of hydrolysis) of 88 mols percent.

There are added, immediately thereafter, 15 parts of technical grade pentaerythritol (composed of about 95% of pentaerythritol and 5% by wt of bipentaerythritol) and two parts of technical grade glycerol.

The blend of these three polyhydric alcohols in the proportions reported herein shows the main melting point peak at 188° C., as measured with DTA method (Differential Thermal Analysis).

The polyvinyl alcohol which has been used has a melting point comprised between 185° C. and 190° C. as measured with the same method indicated above.

After a 6-minute stirring, the temperature within the mass rises to 45° C. The product is then dumped into a polyethylene bag which is hermetically sealed.

The determination of the water contents of the mixture, as measured with the Fisher method upon scavenging with a nitrogen stream at 160° C., given values comprised between 1.5% and 2.5% by wt.

Such water virtually is that which existed originally in the polyvinyl alcohol used.

Forty eight hours as from the preparation, the powdery blend is fed to the feeding hopper of a conventional screw injection press in operation.

By adopting molding temperatures comprised between 200° C. and 220° C., perfectly homogeneous transparent rigid articles are produced.

By allowing such articles to stand in an environment having 65% Relative Humidity at 22° C., a moisture equilibrium is attained which corresponds to 8% of water absorbed by the material so that the pliability of the article is consistently increased.

The same blend mentioned above is fed to an extruder for planar films having a length to diameter ratio of 25 and a compression ratio of 2:1, equipped with cooling rollers for the filmy extrudate, with water circulating at 15° C.

The temperatures set for the electric resistors for the heating of the extrusion barrel range from 200° C. in the feeding zone to 210° C. in the compression zone, to drop to 200° C. towards the extrusion head proper.

The rpm of the screw are to be so adjusted that the rate of flow of the material is such as to make it possible to drive off the residual humidity of the material by feedback toward the loading hopper. In order that the rate of flow of the extruder may be increased, it is advisable to preheat the raw material in the hopper by a circulation of dry air at 80° C.–90° C., or an extruder can be adopted, which is typical for polystyrene and having a degassing zone at about two thirds of the screw span towards the extrusion head.

The film thus produced is transparent, rigid and homogeneous and becomes pliable after a few days of ripening in a moist environment having from 50% to 70% Relative Humidity at 22° C.

Such a film can be used for any of the final uses as they are possible for the conventional plasticized-PVA films as obtained with aqueous solutions of liquid polyhydric alcohols (glycerol) and produced according to the conventional procedures as known heretofore for PVA.

The PVA film as produced according to the present invention exhibits an outstanding imperviousness to both gases and vapors.

When compared with a low density polyethylene film having the same thickness (about 100 nm) the film made according to this invention is 1000 times and over less pervious to oxygen at 65% Rel. Hum. and at 22° C.

EXAMPLE 2

The same blender as described in EXAMPLE 1 is charged with 100 parts of commercial grade polyvinyl alcohol for which a relative viscosity of 13 had been declared (in a 4% aqueous solution) and having a degree of hydrolysis of 86 molar %.

The water as originally contained in such a PVA is 2.6%, as determined according to the Fisher procedure. There are added 13 parts of technical grade pentaerythritol, identical to that used in EXAMPLE 1, 1.3 parts of technical grade glycerol containing 30% of water, 1 part of pure stearic acid and 6 parts of finely powdered zinc oxide.

By dry-blending as in EXAMPLE 1, a mixture is obtained, which contains 3.5% of water, said contents rising to 5% after ripening during 48 hours in an environment having 60% rel. hum. at 20° C.

This mixture is fed to an extruder as conventionally used for polyvinyl chloride, equipped with a degassing zone, of a head adapted to effect a 3-ply construction and with a set of molding apparatus for the production of blown hollow bodies.

The coextrusion is carried out with different materials, such as polyethylene, polypropylene, polyvinyl chloride and shock-resistant polystyrene at temperatures comprised between 190° C. and 220° C.

The PVA layer is the middle lamina sandwiched between two layers of the polymer which has been selected as the structural body for the container. Blown hollow bodies are obtained, in which the PVA layer is preset at a thickness between 50 to 150 nm.

With such thicknesses very low perviousness values towards gases and vapors are obtained, as compared with those which are typical for a single-piece container made with conventional plastics materials.

As an alternative to the extruder equipped with a degassing apparatus, a similar extruder can also be used without degassing apparatus but having the facilities for heating the loading hopper with dry air at 100° C.

Results are obtained which are the same as those described above.

In addition to the blend prepared according to the present EXAMPLE, the same line of extrusion and blowing is fed with the blend prepared as specified in EXAMPLE 1.

Also in this latter case, blown hollow bodies are obtained, in which the intermediate PVA layer is transparent, homogeneous and has outstanding characteristics of imperviousness to the most common gases such as oxygen carbon dioxide and sulphur dioxide.

EXAMPLE 3

The blender described in EXAMPLE 1 is fed with 100 parts of commercial PVA having a viscosity of 20 (diluted in 4% water) and a degree of hydrolysis of 98% mols percent.

There are added 24 parts of technical grade pentaerythritol, as mentioned in EXAMPLE 1, having a m.p. of 197° C., and 1 part of stearic acid.

After a 10-minute mixing, the product is discharged and immediately fed to an injection press equipped with molds for tensile test samples.

There are obtained transparent and homogeneous articles by molding at 220° C.–230° C. Another portion of the product is coextruded with low-density and high-density polyethylenes in the apparatus mentioned in EXAMPLE 2. Blown hollow bodies are obtained, the intermediate PVA layer of which is both transparent and homogeneous and has a thickness between 50 and 150 nm.

EXAMPLE 4

A slow blender having helical spokes as typically used for preparing blends of powders of different natures, is charged with 100 parts of PVA having a viscosity of 13 and a degree of hydrolysis of 88 molar percent. There are added subsequently 10 parts of technical grade pentaerythritol (m.p. 197° C.); 5 parts of trimethylolethane (m.p. 201° C.), 5 parts of mannitol (m.p. 166° C.) and 2 parts of glycerol monostearate.

After 15-minute blending, the homogeneous mixture is discharged into a polyethylene bag and allowed to ripe during about one month at room temperature with an environmental rel. hum. of 50% to 80%. Once this period of time has elapsed, injection moldings and coextrusions of films are carried out and hollow blown bodies are obtained having homogeneous and extremely impervious PVA layers.

EXAMPLE 5

In a speedy blender such as mentioned in EXAMPLE 1, there are introduced 100 parts of PVA having a viscosity of 15 and a degree of hydrolysis of 75 molar percent, followed by 10 parts of mannitol, 12 parts of trimethylolethane and 2 parts of glycerol.

After ripening for 30 days the mixture thus obtained is extruded with no problem in a tubular film extruder of the kind which is typically used for polyethylene, which is equipped with a head adapted for coextrusion of three layers, PE/PVA/PE and equipped with a hopper preheated with dry air at 90° C.

EXAMPLE 6

Powdered blends of PVA as obtained according to the specifications of EXAMPLES 1, 2, 3 and 4 are orderly fed to a granulator extruder equipped with a filter pack having 2000 mesh per $cm^2$.

By working with extrusion temperatures comprised between 190° C. and 220° C. and using an extruder equipped with a degassing zone, "plastics spaghetti" are produced which, upon cooling with air and shaped into cubes are subsequently used for producing films, tubes and injection molded items according to the conventional procedures as adopted for processing polyvinyl chloride (PVC).

EXAMPLE 7

By using the mixture described in EXAMPLE 3, a plane film is prepared which is cooled on steel rollers held at 10° C.

The film after 15 days of ripening at 65% rel. hum. at 20° C. is then cut longitudinally in strips of planar configuration having a width of 12 mm and a thickness of 0.1 mm which are subjected to lengthwise stretching with a ratio 8:1 on a cylinder set typical for producing polypropylene raphia-like threads.

The working temperature is about 40° C.

There are obtained filaments having a thickness of about 50 nm and a width of 6 mm which exhibit a tensile strength of more than 30 kg/$mm^2$.

EXAMPLE 8

To 100 parts of polyvinyl alcohol having a viscosity of 20, corresponding to a degree of polymerization of about 1600 units and a degree of hydrolysis of 99 molar percent and containing 8% of water as originally absorbed moisture, there are added and mechanically blended 20 parts of pentaerythritol, 3 parts of mannitol and 3 parts of a capillary active liquid product consisting of a condensate of 9 mols of ethylene oxide with nonylphenol.

The powdery blend obtained as the end product is fed to an extruder equipped with a degassing and a coextrusion zones, together with polyethylene (PE) having a density of 0.920 and an MFI of 0.2 (ASTM D-1238 Cond. E) for obtaining a 3-ply thin tubular article having the following distribution of thicknesses: 300 nm of PE, 100 nm of PVA and 300 nm of PE.

EXAMPLE 9

To 100 parts of the blend as prepared according to EXAMPLE 8, there are added and intimately admixed 5 parts of finely powdered zinc oxide, 5 parts of polyisobutylene (mol wt about 100.000) and 5 parts of granulated copolymer of ethylene-vinyl acetate (EVAC) containing 30% of vinylacetate.

The mixture is coextruded with polyethylene according to the same procedure as indicated in EXAMPLE 8.

In this case, a substantial improvement is experienced as to the adhesion between the polyethylene layers and the PVA layers.

EXAMPLE 10

To 100 parts of PVA having a degree of polymerization of 2000 and a degree of hydrolysis of 98 molar percent there are intimately admixed 35 parts of technical grade pentaerythritol (m.p. 205° C.) and, moreover, 5 parts of zinc oxides and 5 parts of white talc.

The powdery mixture thus prepared is directly molded in an injection press for polystyrene. There are obtained homogeneous rigid and water insoluble (at room temperature) articles.

From what has been described and exemplified in the foregoing, it can thus be appreciated that the present invention permits to effect a dry blending procedure by which any type of powdered or particulated polyvinyl alcohol (having a degree of polymerization over 500 and a degree of hydrolysis of at least 70 molar percent) can be converted into a thermoplastic blend which is suitable for the direct use in the manufacture of finished articles or parisons by adopting the most common working procedures and the machinery as used in the processing of the conventional plastics materials.

Such a result permits to dispense with all the operations of aqueous solvation of polyvinyl alcohol and its preliminary soaking with liquid plasticizers and the lengthy and expensive procedures which have been deemed heretofore essential and of vital importance in the known art for converting polyvinyl alcohol into a thermoplastic substance without incurring any prohibitive alterations of the material concerned.

I claim:

1. A thermostatic composition based on polyvinyl alcohol and adapted to be subjected as such to the conventional hot shaping procedure for thermoplastic materials, such as molding and extrusion for the production of articles, characterized in that it is composed of a dry mixture of said polyvinyl alcohol containing originally absorbed moisture and one or more solid monomeric polyhydroxylated alcohols which, as such or in mutual admixture, exhibit the main melting point peak as determined by differential thermal analysis (DTA) comprised between 160° C. and 230° C.

2. Composition according to claim 1, characterized in that at least one of said monomeric polyhydroxylated alcohols is a member selected from among the alcohols having at least three primary alcoholic functional groups per mol.

3. Composition according to claim 2, characterized in that said monomeric polyhydroxylated alcohol is a member preferably selected from the group consisting of pure or technical grade pentaerythritol, bipentaerythritol, pure or technical grade, and trimethylolethane.

4. Composition according to claim 1, characterized in that at least one of said monomeric polyhydroxylated alcohols is a member selected from the group consisting of those having two primary alcoholic groups per mol, such as mannitol.

5. Composition according to claim 1, characterized in that said polyvinyl alcohol has a degree of hydrolysis greater than 70%, expressed as a molar fraction, and a degree of polymerization comprised between 500 and 2500.

6. Composition according to claim 1, characterized in that it comprises between 10 and 50 parts of said monomeric polyhydroxylated alcohols per 100 parts of polyvinyl alcohols.

7. Composition according to claim 1, including a component selected from the group consisting of glycol monoethers, glycol monoesters, polycondensed glycols metallic oxides, carbonates, silicates, mineral salts and mixtures thereof having a melting point higher than 160° C., both in their hydrous and anhydrous forms.

8. Composition according to claim 1, characterized in that it contains mixture up to a maximum of 7% by weight on the total.

9. Composition according to claim 1, characterized in that it is in granular form.

* * * * *